US010310750B2

(12) United States Patent
Bordoli et al.

(10) Patent No.: US 10,310,750 B2
(45) Date of Patent: Jun. 4, 2019

(54) MANAGING DISASTER RECOVERY REPLICATION FOR STORAGE VOLUMES

(71) Applicant: International Business Machines Corporation, Armonk, NY (US)

(72) Inventors: Richard A. Bordoli, Winchester (GB); Christopher W. Bulmer, Southampton (GB); Andrew D. Martin, Romsey (GB); Timothy A. Moran, Southampton (GB)

(73) Assignee: International Business Machines Corporation, Armonk, NY (US)

(*) Notice: Subject to any disclaimer, the term of this patent is extended or adjusted under 35 U.S.C. 154(b) by 127 days.

(21) Appl. No.: 15/291,935

(22) Filed: Oct. 12, 2016

(65) Prior Publication Data
US 2018/0101316 A1    Apr. 12, 2018

(51) Int. Cl.
*G06F 3/06* (2006.01)
*G06F 11/20* (2006.01)

(52) U.S. Cl.
CPC ............ *G06F 3/0619* (2013.01); *G06F 3/065* (2013.01); *G06F 3/067* (2013.01); *G06F 3/0689* (2013.01); *G06F 11/20* (2013.01)

(58) Field of Classification Search
CPC ...... G06F 3/0619; G06F 3/065; G06F 3/0665; G06F 3/0689; G06F 11/20; G06F 3/067
USPC .......................................................... 711/114
See application file for complete search history.

(56) References Cited

U.S. PATENT DOCUMENTS

| 7,366,853 | B2* | 4/2008 | Honda | G06F 3/0605 |
| | | | | 711/111 |
| 8,843,718 | B2 | 9/2014 | Usgaonkar et al. | |
| 9,003,142 | B2 | 4/2015 | Blea et al. | |
| 2009/0094403 | A1* | 4/2009 | Nakagawa | G06F 3/0605 |
| | | | | 711/6 |
| 2012/0016840 | A1 | 1/2012 | Lin et al. | |
| 2013/0212345 | A1* | 8/2013 | Nakajima | G06F 3/0605 |
| | | | | 711/161 |

(Continued)

FOREIGN PATENT DOCUMENTS

JP    2011076128    6/2014

OTHER PUBLICATIONS

Srinath Alapati, "Back to Basics: SnapMirror", Tech_OnTap, May 4, 2011.

(Continued)

*Primary Examiner* — Hashem Farrokh
(74) *Attorney, Agent, or Firm* — Kunzler, PC

(57) ABSTRACT

A storage area network comprises: one or more replicating source and target storage volumes accessible by one or more hosts; a volume replication status checker for determining an active replication relationship between a source storage volume and a target storage volume; and a volume visibility engine for setting the target storage volume to be hidden from a host if the target storage volume is visible to the host and has a determined active relationship. The volume replication status checker is further for determining an inactive replication relationship between a source storage volume and a target storage volume; and the volume visibility engine is further for setting the target storage volume to be visible to a host if the target storage volume is hidden from the host and has a determined inactive replication relationship.

20 Claims, 8 Drawing Sheets

(56) References Cited

U.S. PATENT DOCUMENTS

2014/0149666 A1* 5/2014 Nakagawa ............ G06F 3/0605
                                                                                     711/114

OTHER PUBLICATIONS

"EMC VNX Replication Technologies", EMC, Nov. 2015.
"Storage Tek Enterprise Library Sofware Disaster Recovery and Offsite Data Management Guide", Oracle Help Center, docs.oracle.com/en, 2016.

* cited by examiner

| Host Volume Mapping Table 102 | | |
|---|---|---|
| Volume ID | Host ID | Hidden / Visible Status |
| VolumeA | Host1 | Hidden |
| ... | ... | ... |
| VolumeX | HostN | Visible |

FIGURE 1C

| Replication Volume Status Table 104 | | |
|---|---|---|
| Source Volume ID | Target Volume ID | Active / Inactive Status |
| VolumeA | VolumeB | Active |
| ... | ... | ... |
| VolumeX | VolumeY | Inactive |

FIGURE 1D

Volume Visibility Module 200

Volume counter 202

Volume visibility checker 204

Volume replication status checker 206

Volume Visibility Engine 208

Host Volume Mapping Interface 210

Replication Status Interface 212

Volume Visibility Method 300

FIGURE 2

| Host Volume Mapping Table 102.4 | | |
|---|---|---|
| Volume ID | Host ID | Hidden / Visible Status |
| VolumeS.SiteA | Host1 | Visible |
| VolumeT.SiteB | Host1 | Visible |
| ... | ... | ... |

| Replication Volume Status Table 104.4 | | |
|---|---|---|
| Source Volume ID | Target Volume ID | Active / Inactive Status |
| VolumeS.SiteA | VolumeT.SiteB | Active |
| ... | ... | ... |

| Host Volume Mapping Table 102.5 | | |
|---|---|---|
| Volume ID | Host ID | Hidden / Visible Status |
| VolumeS.SiteA | Host1 | Visible |
| VolumeT.SiteB | Host1 | Hidden |
| ... | ... | ... |

| Replication Volume Status Table 104.5 | | |
|---|---|---|
| Source Volume ID | Target Volume ID | Active / Inactive Status |
| VolumeS.SiteA | VolumeT.SiteB | Active |
| ... | ... | ... |

| Host Volume Mapping Table 102.6 | | |
|---|---|---|
| Volume ID | Host ID | Hidden / Visible Status |
| VolumeS.SiteA | Host1 | Offline (site is down) |
| VolumeT.SiteB | Host1 | Visible |
| ... | ... | ... |

| Replication Volume Status Table 104.6 | | |
|---|---|---|
| Source Volume ID | Target Volume ID | Active / Inactive Status |
| VolumeS.SiteA | VolumeT.SiteB | Inactive |
| ... | ... | ... |

MANAGING DISASTER RECOVERY REPLICATION FOR STORAGE VOLUMES

BACKGROUND

The present invention relates to a method and apparatus for managing disaster recovery replication for storage volumes. In particular, the present invention relates to a method and apparatus for managing disaster recovery replication on storage volumes in a storage area network. The present invention operates in the general environment of system recovery for storage area networks.

SUMMARY

In an aspect of the invention there is provided a storage area network comprising: a source and target storage volume, accessible to one or more hosts, and having a possible replication relationship; a volume replication status checker for determining an active replication relationship between the source storage volume and the target storage volume; and a volume visibility engine for setting the target storage volume to be hidden from a host if the target storage volume is visible to the host and has a determined active replication relationship.

In a second aspect of the invention there is provided a controller for a storage area network, said storage area network comprising one or more replicating source and target storage volumes accessible to one or more hosts, said controller comprising: volume replication status checker for determining an active replication relationship between a source storage volume and a target storage volume; and a volume visibility engine for setting the target storage volume to be hidden from a host if the target storage volume is visible to the host and has a determined active replication relationship.

In a third aspect of the invention there is provided a method for a storage area network, said storage area network comprising a replicating source and target storage volume accessible by one or more hosts, said method comprising: determining an active replication relationship between the source storage volume and the target storage volume; and setting the target storage volume to be hidden from a host if the target storage volume is visible to the host and has a determined active replication relationship.

According to a fourth aspect of the invention there is provided a method for a storage area network, said storage area network comprising one or more hosts with access to one or more replicating source and target storage volumes, said method comprising: determining an inactive replication relationship between a source storage volume and a target storage volume; and setting the target storage volume to be visible to a host if the target storage volume is hidden from the host and has a determined inactive replication relationship.

According to a fifth aspect of the invention there is provided a computer program product for a storage area network, said storage area network comprising one or more replicating source and target storage volumes accessible by one or more hosts, the computer program product comprising a computer readable storage medium having program instructions embodied therewith, the program instructions executable by a processor to cause the processor to: determine an active replication relationship between a source storage volume and a target storage volume; and set the target storage volume to be hidden from a host if the target storage volume is visible to the host and has a determined active replication relationship.

BRIEF DESCRIPTION OF THE DRAWINGS

Preferred embodiments of the present invention will now be described, by way of example only, with reference to the following drawings in which:

FIGS. 1C and 1D are data objects in a SAN controller;

FIG. 2 is a component diagram of the preferred embodiment;

DETAILED DESCRIPTION

Figure 1A:
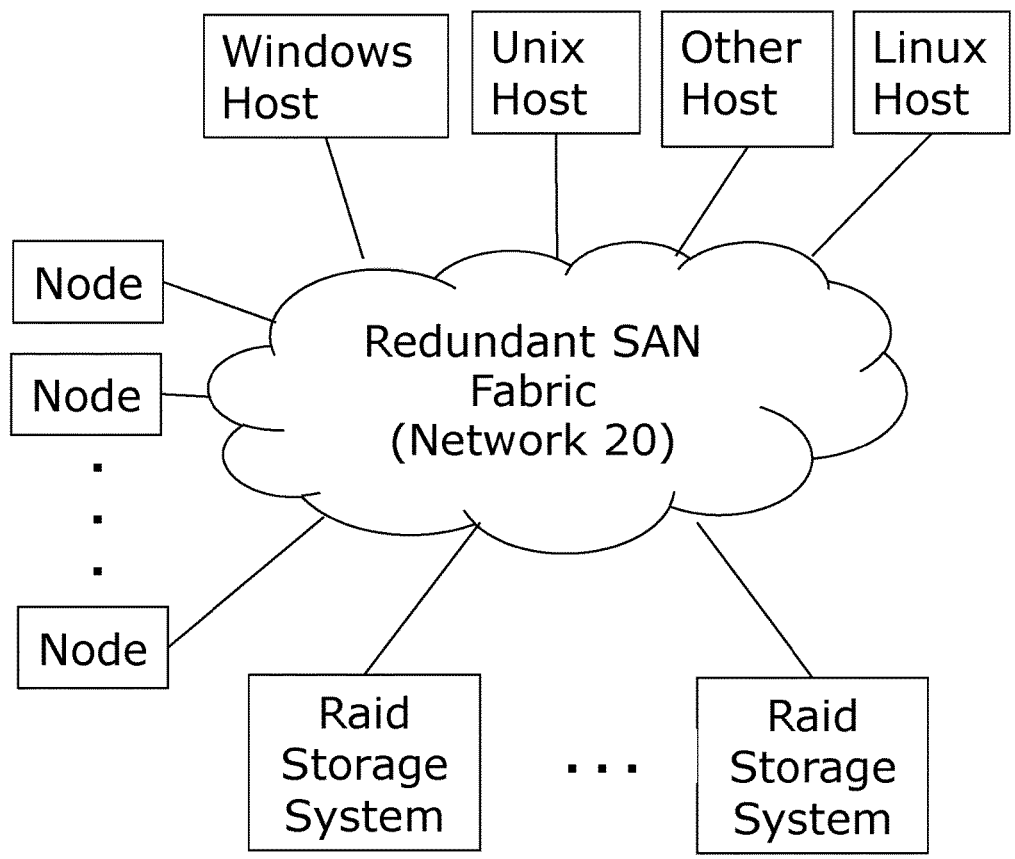
FIG. 1A is a deployment diagram for SAN controllers in a redundant SAN fabric.

Referring to FIG. 1A, storage volume controllers of a storage area network (SAN) of the preferred embodiment (labelled nodes in FIGS. 1A and 1B) combine SAN volume controller software and SAN volume controller hardware into a comprehensive, modular appliance that uses symmetric virtualization. Symmetric virtualization is achieved by creating a pool of managed disks in the SAN. Managed disks (MDisks) are provided by RAID storage systems. The managed disks are mapped to a set of volumes for use by attached host systems. System administrators can view and access a common pool of storage in the SAN. This functionality helps administrators to use storage resources more efficiently and provides a common base for advanced functions.

A SAN can be a Fibre Channel storage network or other high-speed storage network that connects host systems and storage devices. A host system can be connected to a storage device across the SAN. The connections are made through units such as routers and switches. The area of the network that contains these units is known as the fabric of the network.

A SAN volume controller provides functions for the host systems that attach to SAN volume controller: creates a single pool of storage; provides logical unit virtualization; manages logical volumes; mirrors logical volumes. A SAN volume controller also provides functions including: large scalable cache; copy services; and space management. Copy services include: a point-in-time copy, an active-active copy, a metro mirror (synchronous copy), a global mirror (asynchronous copy) and data migration. Space management includes a function to migrate the most frequently used data to higher-performance storage; metering of service quality; thin-provisioned logical volumes; and compressed volumes to consolidate storage.

FIG. 1A shows several example host types (Windows; Unix; Linux or other host), SAN Volume Controller nodes, and RAID storage systems connected to a redundant SAN fabric. The redundant SAN fabric comprises a fault-tolerant arrangement of two or more counterpart SANs that provide alternative paths for each SAN-attached device. Windows is a trademark of Microsoft Corporation in the United States, other countries, or both. Linux is a registered trademark of Linus Torvalds in the United States, other countries, or both. Unix is a trademark of The Open Group A SAN volume controller presents volumes to the hosts. Most of the advanced functions that SAN volume controller provides are defined on volumes. These volumes are created from the MDisks that are presented by the RAID storage systems (or by RAID arrays that are provided by flash drives in an expansion enclosure). Some details in the embodiments are described with respect to a single host and the embodiments envisage scaling up those details to apply to many hosts independently.

SAN volume controllers operate as a single system and present a single point of control for system management and service. System management and error reporting are provided through an Ethernet interface to one of the nodes in the system, which is called the configuration node. The configuration node runs a web server and provides a command-line interface (CLI). The configuration node is a role that any node can take. If the current configuration node fails, a new configuration node is selected from the remaining nodes. Each node also provides a command-line interface and web interface for initiating hardware service actions.

I/O operations between hosts and SAN volume controllers and between SAN volume controllers and RAID storage systems use the SCSI standard. The SAN volume controller communicate with each other through private SCSI commands. Fibre Channel over Ethernet connectivity is also supported on some types of SAN Volume Controllers.

Figure 1B:
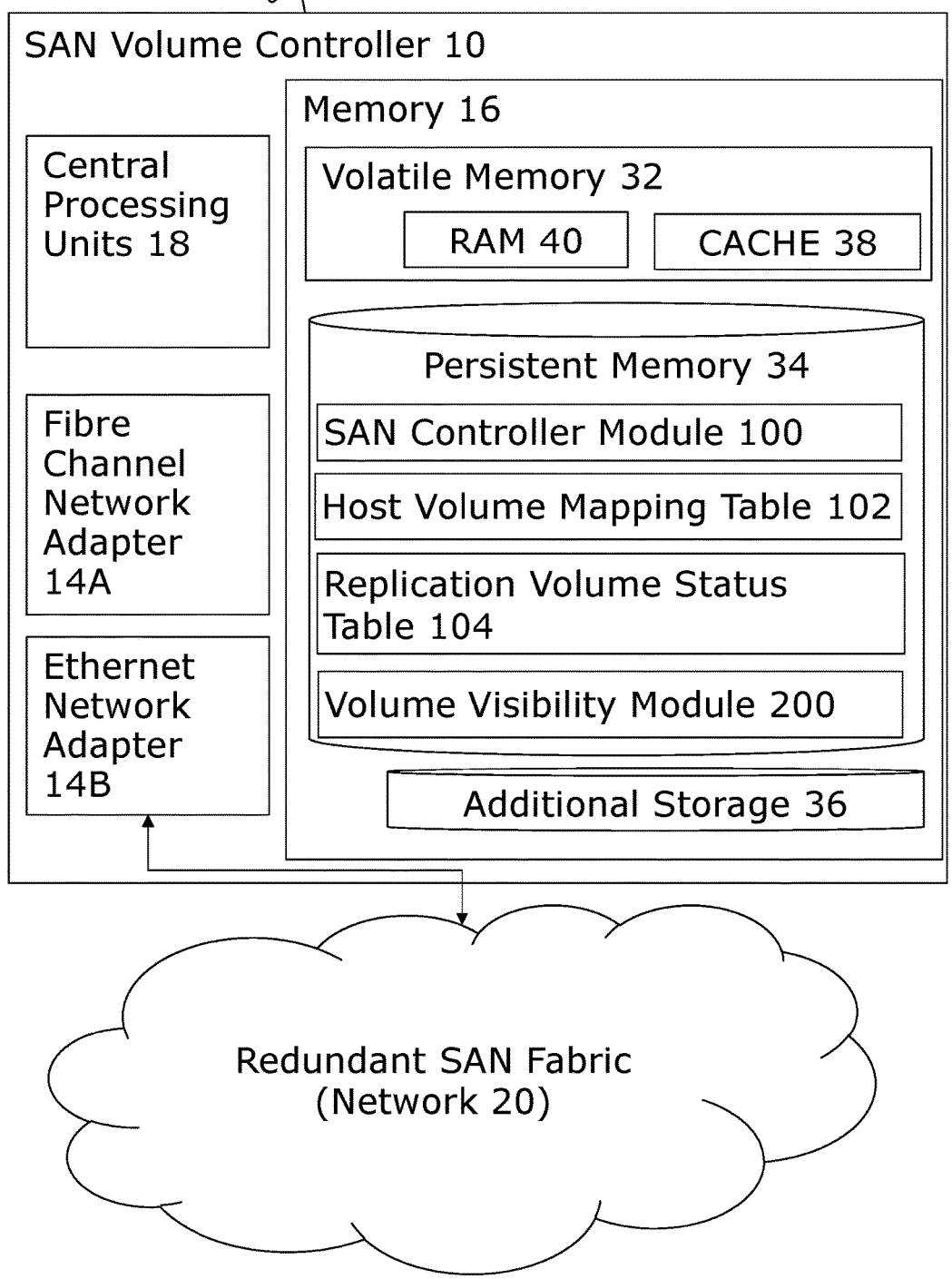
FIG. 1B is a deployment diagram of the preferred embodiment in a SAN controller.

Referring to FIG. 1B, the deployment of a preferred embodiment in a SAN volume controller is described. SAN volume controller 10 is operational with numerous other general purpose or special purpose computing system environments or configurations. Examples of well-known computing processing systems, environments, and/or configurations that may be suitable for use with SAN volume controller 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment, for example, where computer processing systems are distributed as a network of objects that can interact with a computing service.

Some SAN volume controllers contain flash drives or are attached to expansion enclosures that contain flash drives. These flash drives can be used to create RAID-managed disks (MDisks) that in turn can be used to create volumes.

Each SAN volume controller is an individual server in a SAN volume controller clustered system on which the SAN volume controller software runs. SAN volume controllers can be installed alone or in pairs. A pair of SAN volume controllers is known as an I/O group. An I/O group takes the storage that is presented to the SAN by the storage systems as MDisks and translates the storage into logical disks (volumes) that are used by applications on the hosts. A SAN volume controller is in only one I/O group and provides access to the volumes in that I/O group.

SAN volume controller 10 has the following features: a rack-mounted enclosure 12; at least one Fibre Channel network adapter 14A and/or Ethernet network adapter 14B; optional second, third, and fourth network adapters; memory 16 for each processor; one or two, multi-core processors 18; dual redundant power supplies (not shown); dual redundant batteries (not shown); and expansion enclosures (not shown) to house the flash drives.

SAN volume controller 10 may be described in the general context of computer system executable instructions, such as program modules, being executed by a computer processor. Generally, program modules may include: routines; programs; objects; components; logic; and data structures that perform particular tasks or implement particular abstract data types. SAN volume controller 10 may be embodied in distributed cloud computing environments where tasks are performed by remote processing devices that are linked through a communications network. In a distributed cloud computing environment, program modules may be located in both local and remote computer system storage media including memory storage devices.

SAN volume controller 10 is a computer server that specializes in storage. SAN volume controller 10 is connected to a network 20 known as redundant SAN fabric. SAN volume controller 10 communicates with network devices (shown in FIG. 1) over network 20.

CPUs 18 load machine instructions from memory 16 and perform machine operations in response to the instructions. Such machine operations include: incrementing or decrementing a value in a register; transferring a value from memory 16 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program; the machine instructions are written in a machine code language which is referred to as a low level language. A computer program written in a high level language needs to be compiled to a machine code program before it can be run. Alternatively, a machine code program such as a virtual machine or an interpreter can interpret a high level language in terms of machine operations.

Memory 16 includes computer system readable media in the form of volatile memory 32; non-volatile or persistent memory 34; and additional storage 36. Examples of volatile memory 32 are cache memory 38 and random access memory (RAM) 40. Examples of persistent memory 34 are read only memory (ROM) and erasable programmable read only memory (EPROM). Generally volatile memory is used because it is faster and generally non-volatile memory is used because it will hold the data for longer. SAN volume controller 10 may further include other removable and/or non-removable, volatile and/or non-volatile computer system storage media 36 that may be used as one or more storage volumes in addition or instead of external RAID systems. By way of example only, persistent memory can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected by one or more data media interfaces. As will be further depicted and described below, memory 30 includes a program product having at least one module that is configured to carry out the functions of embodiments of the invention.

Modules configured to carry out the functions of the preferred embodiment comprise: SAN controller module 100; Host volume mapping table 102; replication volume status table 104; and volume visibility module 200. In the preferred embodiment, the modules are loaded from the persistent memory 34 into volatile memory 32 for operation. In another embodiment, ROM in memory 30 stores the modules for enabling the computer server 12 to function as a special purpose computer specific to modules 100 and 200. Further program modules that support the preferred embodiment but are not shown include firmware, boot strap program, operating system, and support applications. Each of the operating system; support applications; other program modules; and program data; or some combination thereof, may include an implementation of a networking environment.

Referring to FIG. 1C, host volume mapping table 102 comprises a record for volumes in the SAN system; each record comprising: a volume ID; a host ID; and a hidden/visible status. The volume ID field contains a volume identifier (for example VolumeA to VolumeX). The host ID field contains a host identifier for a host that has access to the volume (for example, Host1 to HostN). The hidden/visible status field contains an indicator to show whether the volume is hidden or visible to the host (for example "Hidden" or "Visible" or "1" or "0"). A volume may have more than one record depending on how many hosts have access to the volume. In other embodiments, different table structures and different data structures can be used to store the relationship between volume ID; host ID; and hidden/visible status.

Referring to FIG. 1D, replication volume status table 104 comprises a record for each replicating pair of volumes in the SAN system; each record comprising: a source storage volume ID field; a target storage volume ID field; and an active/inactive status field. The source storage volume ID field contains a volume identifier (for example VolumeA to VolumeX). The target storage volume ID field contains a volume identifier (for example VolumeB to VolumeY). The active/inactive status field contains an indicator to show whether the volume is active or inactive for replication (for example "Active" or "Inactive" or "1" or "0"). In other embodiments, different table structures and different data structures can be used to store the relationship between source storage volume ID field; target storage volume ID field; and active/inactive status.

Referring to FIG. 2, volume visibility module 200 comprises the following components: volume counter 202; volume visibility checker 204; volume replication status checker 206; volume visibility engine 208; host volume mapping interface 210; replication status interface 212; and volume visibility method 300.

Volume counter 202 is for counting the storage volumes in the host volume mapping table and making sure each one is considered by the volume visibility module 200.

Volume visibility checker 204 is for determining the volume visibility status in the host volume mapping table.

Volume replication status checker 206 is for determining the volume replication status in the replication volume status table.

Volume visibility engine 208 is for setting a volume to hidden if the volume is a replication target and in an active replication relationship; and for setting a volume to visible if the volume is a replication target and not in an active replication relationship.

Host volume mapping interface 210 is for providing access to host volume mapping table.

Replication status interface 212 is for providing access to the replication volume status table.

Volume visibility method 300 is for controlling the components of volume visibility module 200 to perform the preferred embodiment.

Figure 3:
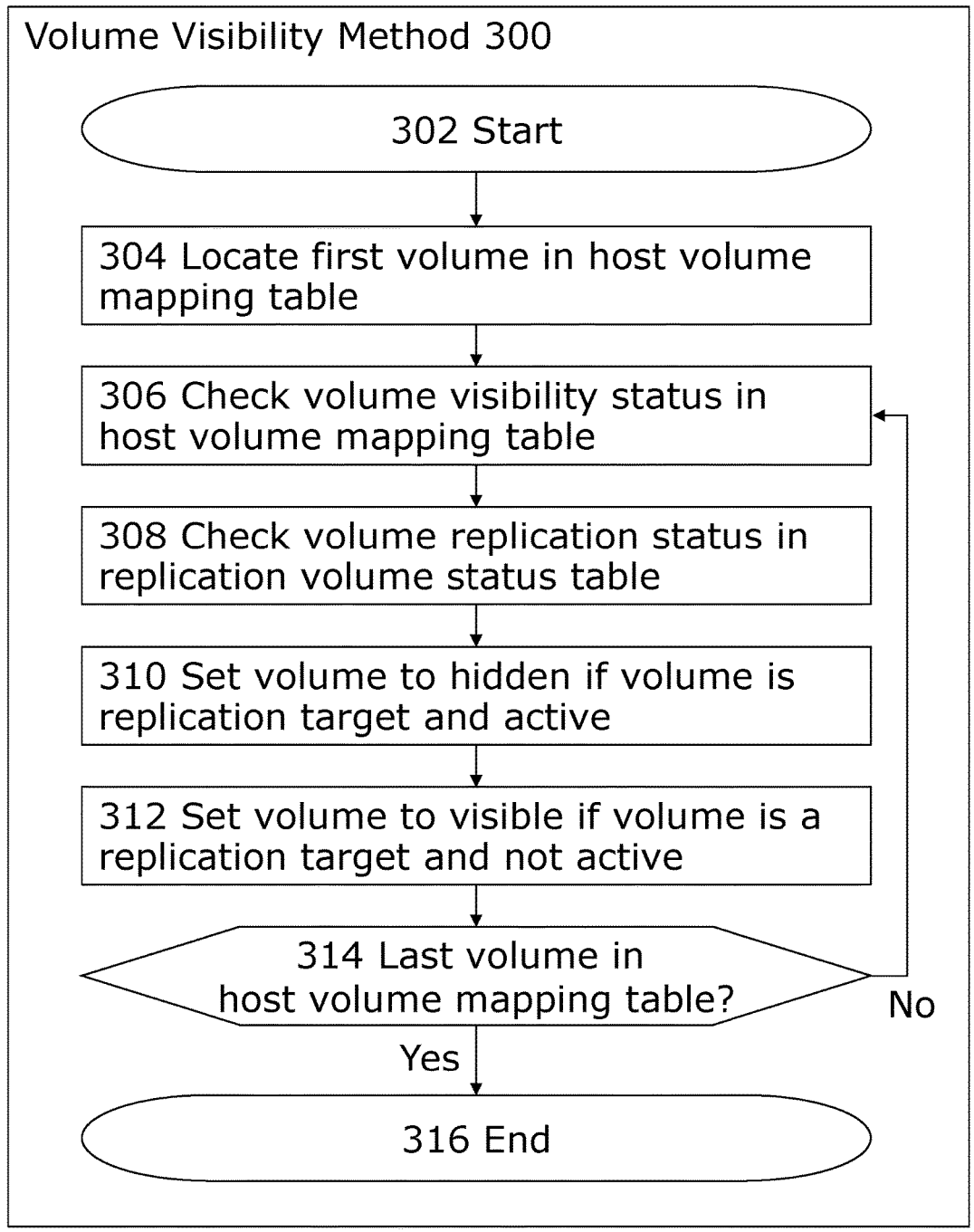
FIG. 3 is a flow diagram of a process of the preferred embodiment.

Referring to FIG. 3, preferred embodiment volume visibility method 300 comprises logical process steps 302 to 316. Although there is an order to the preferred embodiment steps as described, the steps may not necessarily need to be in this order unless specified and in other embodiments steps can be in a different order.

Step 302 is the start of the volume visibility method which is initiated either by a periodic event (regular checking) or by a by non-periodic events (for example the removal or amendment of the replication relationship).

Step 304 is for locating a first volume in the host mapping table 102.

Step 306 is for determining the volume visibility status in host mapping table 102.

Step 308 is for determining the volume replication status in replication status table 104.

Step 310 is for setting the volume to a hidden state in host volume mapping table 102 if the volume is a replication target and active.

Step 312 is setting the volume to a visible state in host volume mapping table 102 if the volume is a replication target and not active.

Step 314 is for locating the next volume in the host volume mapping table and proceeding from step 306. If the volume if the last volume in the volume mapping table 102 the method proceeds to step 316.

Step 316 is the end of the method.

In other embodiments, it is envisaged that the target storage volumes in the replication volume status table are stepped through as opposed to stepping through each volume in the volume mapping table. In these embodiments, each host that has access to the target storage volume is checked for visible access and/or hidden access against the replication status of the target storage volume.

Referring to FIGS. 4A, 4B, 4C, 5A, 5B, 5C, 6A, 6B and 6C there is shown a schematic relationship between a host and two storage controllers during replication and a site loss event and corresponding host mapping and replication volume status tables.

Figures 4A, 4B, 4C:
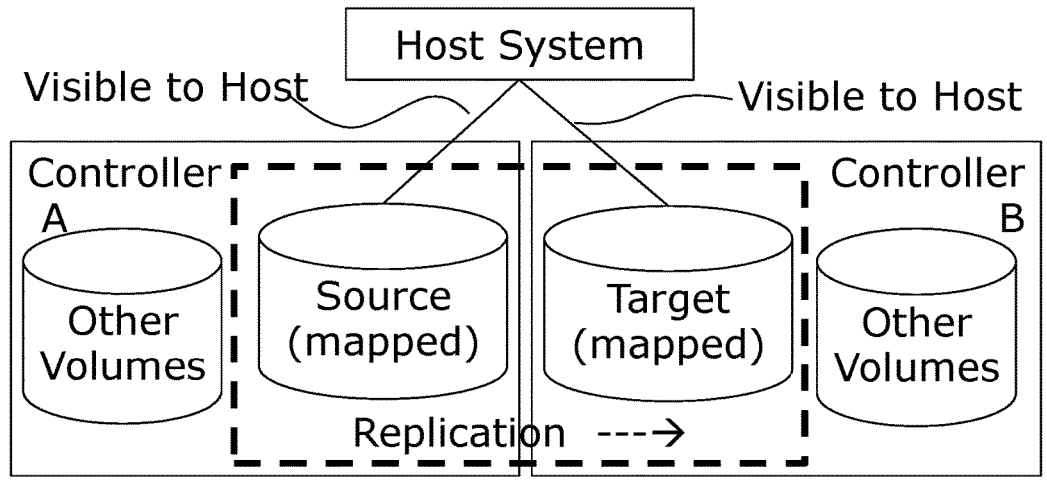
FIGS. 4A, 5A and 6A are state diagrams showing three different example states for a host and a pair of storage controllers.
FIGS. 4B, 5B and 6B are corresponding example states of a host volume mapping table.
FIGS. 4C, 5C and 6C are corresponding example states of a replication volume status table.
Figures 5A, 5B, 5C:
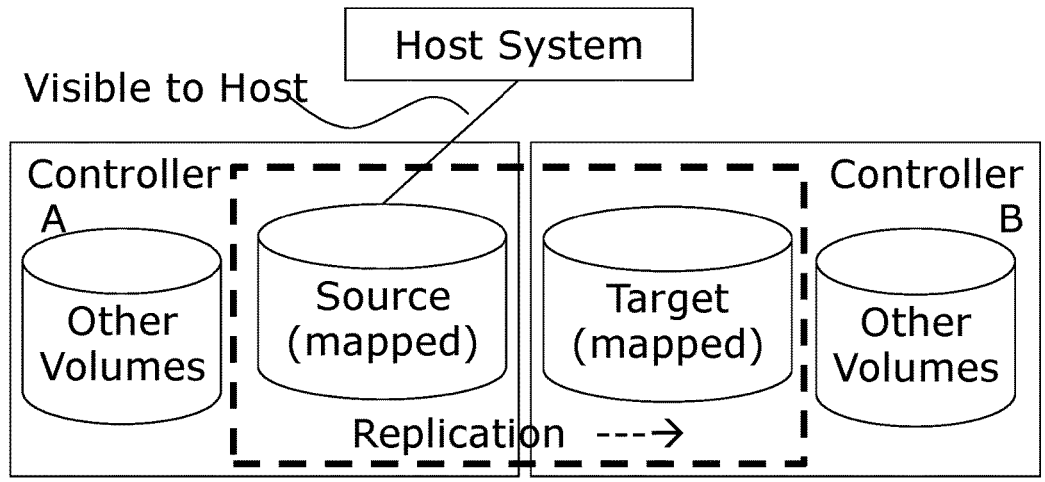
Figures 6A, 6B, 6C:
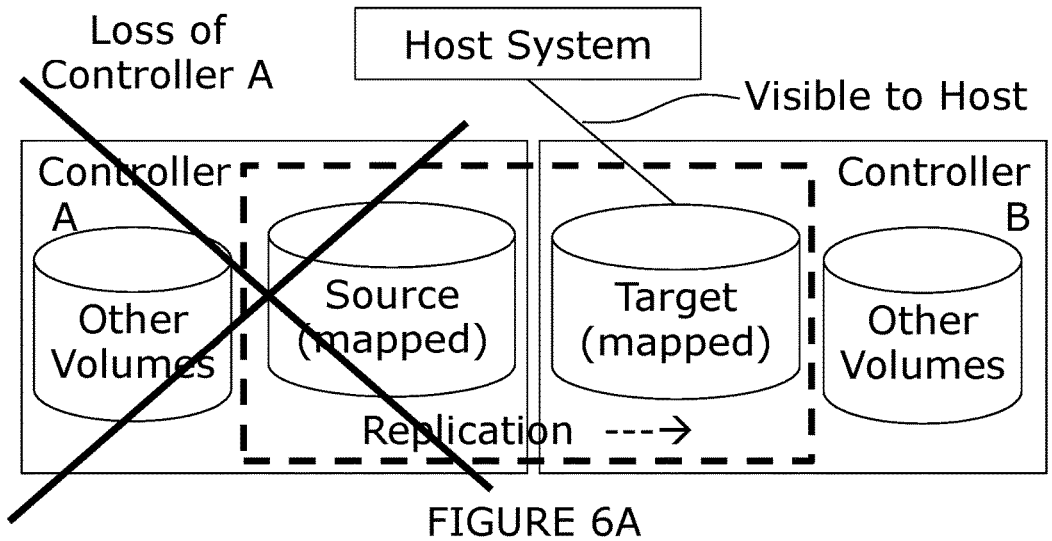

FIGS. 4A, 5A and 6A show schematic representation of storage controllers and hosts in: replicating state before performance of the embodiment (FIG. 4A); replicating state after performance of the embodiment (FIG. 5A); and a site loss state after performance of the embodiment (FIG. 6A). The storage controller at site A comprises: a replication source storage volume (mapped to a target storage volume at site B) and other volumes (not mapped to other volumes). Storage controller at site B comprises: a replication target storage volume (mapped to the source storage volume at site A) and other volumes (not mapped to other volumes).

FIGS. 4B, 5B and 6B show corresponding host volume mapping tables (102.4, 102.5 and 102.6).

FIGS. 4C, 5C and 6C show corresponding replication volume status tables (104.4, 104.5 and 104.6).

Referring to FIG. 4A, replication source storage volume (VolumeS.SiteA) at site A is shown to have a replication relationship with replication target storage volume (VolumeT.SiteB) at site B. The host system is shown to have visibility of both the replication source storage volume and the replication target storage volume. This is a normal state before performance of the embodiment. FIG. 4B shows host volume mapping table 102.4 with both VolumeS.SiteA and VolumeT.SiteB having visible status. FIG. 4C shows replication volume status table 104.4 with the VolumeS.SiteA and VolumeT.SiteB having a replication relationship that is active.

Volume visibility method 300 is initiated with a first volume located (step 302) in host volume mapping table 102; the method repeats without action until the replication target storage volume is located. The volume visibility status is checked in the host volume mapping table (step 306) and found to be visible. The volume replication status is checked (step 308) in the replication status table 104 and found to be active. The volume is set to hidden (step 310) since the volume is a replication target and active. Since there are no more replication targets then the method ends (step 314, 316). This new state is shown in FIGS. 5A, 5B and 5C.

Referring to FIG. 5A, replication source storage volume at site A is shown to have a replication relationship with replication target storage volume at site B. The host system is now shown to have visibility with only the replication source storage volume (there is no relationship line joining the host and the replication target storage volume at site B). This is a normal state after performance of the embodiment in a stable replication situation. FIG. 5B shows host volume mapping table 102.5 with VolumeS.SiteA having visible status and VolumeT.SiteB having hidden status. FIG. 5C shows replication volume status table 104.5 with the VolumeS.SiteA and VolumeT.SiteB having a replication relationship that is active.

The next state is a loss of site A such as occurs in a catastrophic power loss or fire and site A goes offline. Volume visibility method 300 is initiated with a first volume located (step 302) in host volume mapping table 102 and the method repeats without action until the replication target storage volume is located. The volume visibility status is checked in the host volume mapping table (step 306) and found to be hidden. The volume replication status is checked (step 308) in the replication status table 104 and found to be inactive. The volume is set as visible (step 310) since the volume is a replication target and not in an active replication relationship (that is the volume has been active all along but becomes visible now that its replication relationship has stopped due to the loss of site A). Since there are no more replication targets then the method ends (step 314, 316). This new state is shown in FIGS. 6A, 6B and 6C.

Referring to FIG. 6A, loss of site A is shown. The host system is now shown to have visibility with only the replication target storage volume at site B (there is no relationship line joining the host and the replication source storage volume at site A). This is the state after performance of the embodiment after a storage controller site loss. FIG. 6B shows host volume mapping table 102.6 with VolumeS.SiteA having an offline status (because the site is down) and VolumeT.SiteB having visible status. FIG. 6C shows replication volume status table 104.6 with the VolumeS.SiteA and VolumeT.SiteB having a replication relationship that is inactive.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

The invention claimed is:

1. A storage area network comprising:
a source and target storage volume, accessible to one or more hosts, and having a possible replication relationship;
a volume replication status checker for determining an active replication relationship between the source storage volume and the target storage volume; and
a volume visibility engine for setting the target storage volume to be hidden from a host as a result of determining that the target storage volume is visible to the host and as a result of the volume replication status checker determining that there is an active replication relationship between the source storage volume and the target storage volume, wherein determining that the target storage volume is visible to the host comprises checking a volume mapping table for an indication of whether the target storage volume is visible to the host.

2. A storage area network according to claim 1, wherein:
the volume replication status checker is further for determining an inactive replication relationship between the source storage volume and the target storage volume; and
the volume visibility engine is further for setting the target storage volume to be visible to a host with access if the target storage volume is hidden from the host and has a determined inactive replication relationship.

3. A storage area network according to claim 1, wherein:
the volume replication status checker is further for determining if other target storage volumes in the storage area network have active replication relationships; and
the volume visibility engine is further for setting a further target storage volume to be hidden from a host if the further target storage volume is visible to the host and has a determined active relationship.

4. A storage area network according to claim 2, wherein:
the volume replication status checker is further for determining if other target storage volumes in the storage area network have inactive replication relationships; and the volume visibility engine is further for setting a further target storage volume to be visible to a host if the further target storage volume is hidden from the host and has a determined inactive replication relationship.

5. A controller for a storage area network, said storage area network comprising one or more replicating source and target storage volumes accessible to one or more hosts, said controller comprising:
volume replication status checker for determining an active replication relationship between a source storage volume and a target storage volume; and
a volume visibility engine for setting the target storage volume to be hidden from a host as a result of determining that the target storage volume is visible to the host and as a result of the volume replication status checker determining that there is an active replication relationship between the source storage volume and the target storage volume, wherein determining that the target storage volume is visible to the host comprises checking a volume mapping table for an indication of whether the target storage volume is visible to the host.

6. A controller according to claim 5, wherein:
the volume replication status checker is further for determining an inactive replication relationship between a source storage volume and a target storage volume; and
the volume visibility engine is further for setting the target storage volume to be visible to a host if the target storage volume is hidden from the host and has a determined inactive replication relationship.

7. A controller according to claim 5, wherein:
the volume replication status checker is further for determining if other target storage volumes in the storage area network have active replication relationships; and
the volume visibility engine is further for setting a further target storage volume to be hidden from a host if the target storage volume is visible to the host and has a determined active replication relationship.

8. A controller according to claim 6, wherein:
the volume replication status checker is further for determining if other target storage volumes in the storage area network have inactive replication relationships; and
the volume visibility engine is further for setting a further target storage volume to be visible to a host if the target storage volume is hidden from the host and has a determined inaction replication relationship.

9. A method for a storage area network, said storage area network comprising a replicating source and target storage volume accessible by one or more hosts, said method comprising:
determining an active replication relationship between the source storage volume and the target storage volume; and
setting the target storage volume to be hidden from a host as a result of determining that the target storage volume is visible to the host and as a result of the volume replication status checker determining that there is an active replication relationship between the source storage volume and the target storage volume, wherein determining that the target storage volume is visible to the host comprises checking a volume mapping table for an indication of whether the target storage volume is visible to the host.

10. A method according to claim 9, further comprising:
determining an inactive replication relationship between a source storage volume and a target storage volume; and
setting the target storage volume to be visible to a host if the target storage volume is hidden from the host and has an inactive replication relationship.

11. A method according to claim 9, further comprising:
determining if other target storage volumes in the storage area network have active replication relationships; and
setting a further target storage volume to be hidden from a host if the target storage volume is visible to the host and has a determined active replication relationship.

12. A method according to claim 10, further comprising:
determining if other target storage volumes in the storage area network have inactive replication relationships; and
setting a further target storage volume to be visible to a host if the target storage volume is hidden from the host and has a determined inactive replication relationship.

13. A method for a storage area network, said storage area network comprising one or more hosts with access to one or more replicating source and target storage volumes, said method comprising:
determining an inactive replication relationship between a source storage volume and a target storage volume; and
setting the target storage volume to be visible to a host as a result of determining that the target storage volume is hidden from the host and as a result of the volume replication status checker determining that there is an inactive replication relationship between the source storage volume and the target storage volume, wherein determining that the target storage volume is hidden from the host comprises checking a volume mapping table for an indication of whether the target storage volume is hidden from the host.

14. A method according to claim 13, further comprising:
determining an active replication relationship between a source storage volume and a target storage volume; and
setting the target storage volume to be hidden from a host if the target storage volume is visible to the host and has a determined active replication relationship.

15. A method according to claim 13, further comprising:
determining if other target storage volumes in the storage area network have inactive replication relationships; and
setting a further target storage volume to be visible to a host if the further target storage volume is hidden from to the host and has a determined inactive replication relationship.

16. A method according to claim 14, further comprising:
determining if other target storage volumes in the storage area network have active replication relationships; and
setting a further target storage volume to be hidden from a host if the target storage volume is visible to the host and has a determined active replication relationship.

17. A computer program product for a storage area network, said storage area network comprising one or more replicating source and target storage volumes accessible by one or more hosts, the computer program product comprising a computer readable storage medium having program instructions embodied therewith, the program instructions executable by a processor to cause the processor to:
determine an active replication relationship between a source storage volume and a target storage volume; and
set the target storage volume to be hidden from a host as a result of determining that the target storage volume is visible to the host and as a result of the volume replication status checker determining that there is an active replication relationship between the source storage volume and the target storage volume, wherein determining that the target storage volume is visible to the host comprises checking a volume mapping table for an indication of whether the target storage volume is visible to the host.

18. A computer program product according to claim 17, the program instructions executable by a processor to further cause the processor to:

determine an inactive replication relationship between a source storage volume and a target storage volume; and set the target storage volume to be visible to a host if the target storage volume is hidden from the host and has a determined inactive replication relationship.

19. A computer program product according to claim 17, the program instructions executable by a processor to further cause the processor to:

determine if other target storage volumes in the storage area network have active replication relationships; and set a further target storage volume to be hidden from a host if the target storage volume is visible to the host and has a determined active replication relationship.

20. A computer program product according to claim 18, the program instructions executable by a processor to further cause the processor to:

determine if other target storage volumes in the storage area network have inactive replication relationships; and set a further target storage volume to be visible to a host if the target storage volume is hidden from the host and has a determined inactive replication relationship.

* * * * *